United States Patent [19]

Nixon

[11] 4,094,480

[45] June 13, 1978

[54] AIRCRAFT ALTITUDE HOLD SYSTEM

[75] Inventor: John M. Nixon, Mineral Wells, Tex.

[73] Assignee: Edo-Aire Mitchell, Mineral Wells, Tex.

[21] Appl. No.: 784,525

[22] Filed: Apr. 4, 1977

Related U.S. Application Data

[63] Continuation of Ser. No. 716,442, Aug. 23, 1976, abandoned.

[51] Int. Cl.² .............................................. G05D 1/08
[52] U.S. Cl. ................................... 244/180; 318/584; 343/112 A; 364/433
[58] Field of Search ...................... 244/180; 318/584; 235/150.2, 151.32; 340/27 R; 343/112 A

[56] References Cited

U.S. PATENT DOCUMENTS

| 3,578,269 | 5/1971 | Kramer | 235/150.2 |
| 3,940,673 | 2/1976 | Darlington | 244/180 |

*Primary Examiner*—Trygve M. Blix
*Assistant Examiner*—Reinhard J. Eisenzopf
*Attorney, Agent, or Firm*—Richards, Harris & Medlock

[57] ABSTRACT

Aircraft altitude is maintained through control surfaces responsive to an altitude hold control voltage varying with the output of a pressure transducer. The pressure transducer provides an output varying in a linear relationship with absolute atmospheric pressure and this output is applied to the input of a nonlinear circuit that generates a voltage varying linearly with altitude. A digital-to-analog converter generates an altitude reference voltage in response to an altitude hold engage signal and this voltage is combined in a summing amplifier with the voltage varying linearly with altitude. Also summed with the altitude reference voltage and the voltage varying linearly with altitude in the summing amplifier is a standard reference voltage. The total summation that is made in the summing amplifier produces the altitude hold control voltage as an output thereof. This altitude hold control voltage is also compared with the standard reference voltage to provide control signals to the digital-to-analog converter.

23 Claims, 7 Drawing Figures

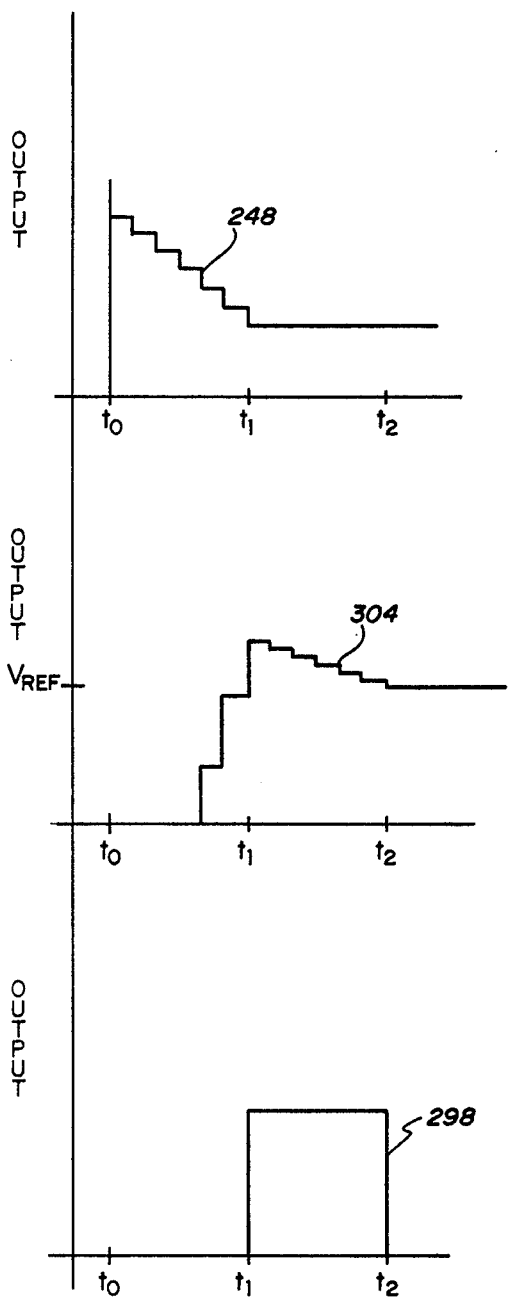
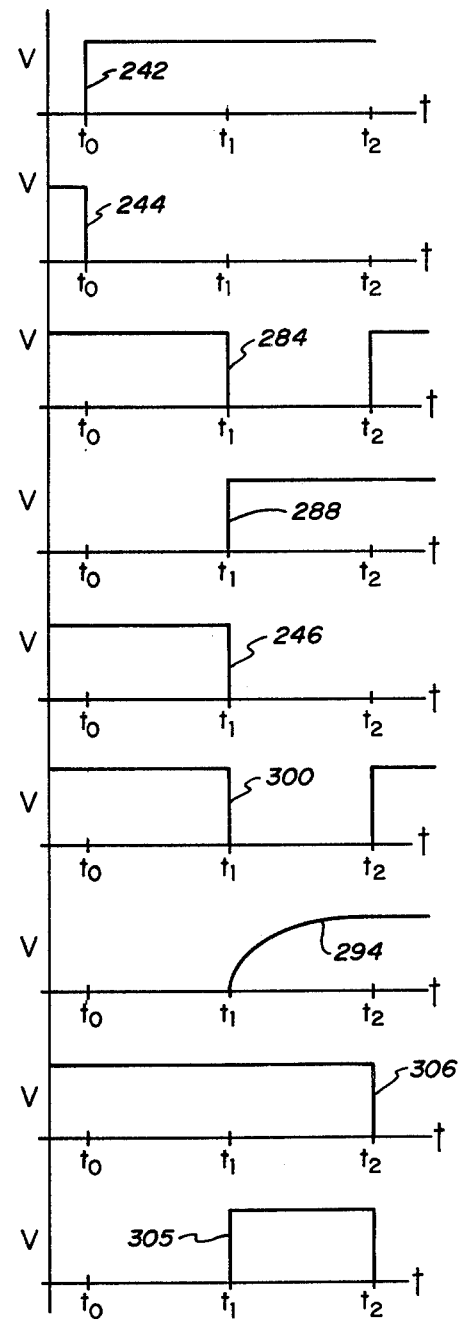
FIG. 6
FIG. 7

AIRCRAFT ALTITUDE HOLD SYSTEM

This is a continuation of application Ser. No. 716,442, filed Aug. 23, 1976, now abandoned.

This invention relates to the automatic control of an aircraft, and more particularly to an altitude hold system for capturing and holding a selected altitude as set by a pilot or the output of an automatic control.

Some of the earliest altitude hold systems provided means for simply switch an aircraft control system into an altitude hold configuration when a desired altitude is reached. Obviously, such a simplified system had numerous shortcomings, one of the most significant being that the lag of aircraft response introduced an overshoot that resulted in hunting around the desired altitude until the aircraft finally settled on the selected altitude.

Some aircraft altitude hold systems presently incorporate pressure transducers that cooperate with an air speed sensor which overrides and renders ineffective the transducer when air speed is too high or too low. This controls the overshoot maneuvers somewhat, but more significantly minimizes the discomfort that may be experienced as the aircraft hunts for the selected altitude.

In altitude hold systems, the pressure transducer provides an accurate reference for a selected altitude and has been widely accepted as the primary signal source. However, to minimize the overshoot problem the output of the pressure transducer requires a reference source to produce an altitude hold control signal for maintaining a selected altitude.

In accordance with the present invention, a system for maintaining aircraft altitude is provided that minimizes variations in altitude by precisely commanding a selected altitude. The system includes in combination with aircraft control surfaces a transducer having an output voltage varying in an established relationship with altitude pressure. This transducer output voltage is applied to a nonlinear circuit that generates an output voltage varying with altitude. In addition, the system incorporates a digital-to-analog converter generating a reference voltage representing a desired altitude. This reference voltage and the output voltage varying with altitude are summed with a standard reference voltage in a summing network to generate an altitude hold control voltage for actuating a system to position the aircraft control surfaces.

Further in accordance with the present invention, the altitude hold control voltage is compared with the standard reference voltage to produce a feedback to control the analog-to-digital converter.

For a more complete understanding of the present invention and the advantages thereof, reference may now be had to the following description taken in conjunction with the accompanying drawings.

Referring to the drawings:

FIG. 6 is a series of plots of time versus voltage illustrating the operation of the circuitry of FIG. 5; and FIG. 7 is a series of plots of time versus voltage for illustrating the operation of the timing logic for the counters of FIG. 5.

Figure 1:
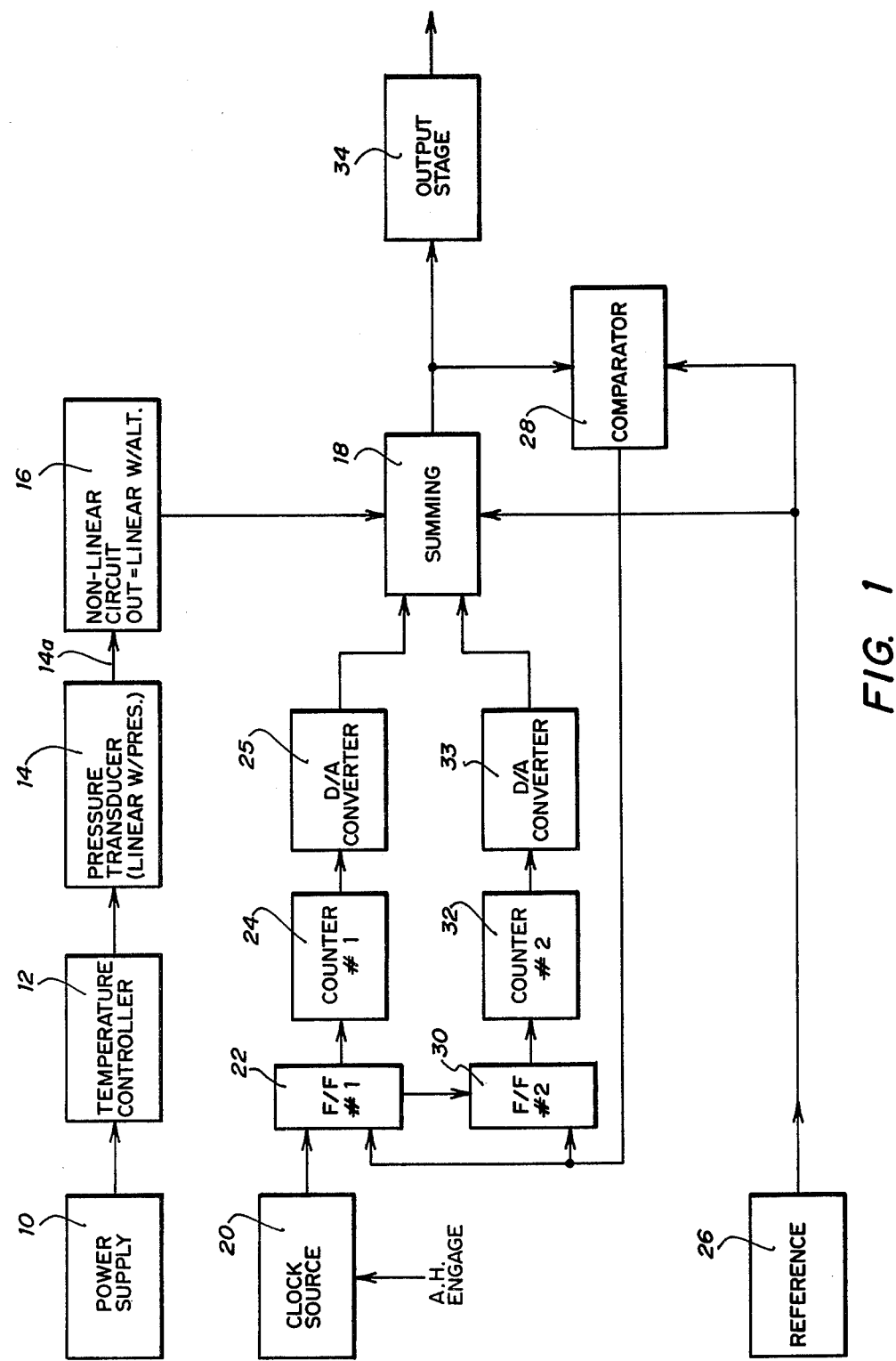
FIG. 1 is a block diagram of a system for maintaining aircraft altitude in accordance with an altitude hold control voltage applied to aircraft control surfaces.

The system illustrated in the drawings provides for automatic control of an aircraft whereby a pressure transducer serves to provide a primary control signal for maintaining a selected altitude.

One embodiment of the invention, as illustrated in FIG. 1, includes a power supply 10 providing a voltage to a temperature controller 12 that maintains the temperature environment for a pressure transducer 14. The pressure transducer 14 may be of a conventional design responsive to changes in atmospheric pressure, such as by means of an aneroid, and providing an output voltage that varies linearly with pressure. This output is applied to a nonlinear circuit 16 wherein it is converted into a voltage varying linearly with altitude. The linear altitude voltage at the output of the nonlinear circuit 16 is applied to one input of a summing amplifier 18.

A second input to the summing amplifier 18 is a standard reference voltage as generated at the output of a reference generator 26. Third and fourth inputs to the summing amplifier 18 are components of an altitude reference voltage developed respectively at the output of digital-to-analog converters 25 and 33 connected, respectively, to counters 24 and 32. Voltages generated by the digital-to-analog converters 25 and 33 are related to digital values stored in the counters 24 and 32 and represent the desired altitude. The counters 24 and 32 are respectively controlled by flip-flops 22 and 30, each of which receives clocking pulses from a clock source 20.

At the output of the summing network 18 there is generated an altitude hold control voltage that is applied to an output stage 34 and a comparator amplifier 28. The output stage conditions the altitude hold control voltage for application to a conventional aircraft flight control system for positioning aircraft control surfaces. The standard reference voltage at the output of the reference generator 26 is also connected to one input of the comparator amplifier 28 wherein it is compared with the altitude hold control voltage. When the output of the summing amplifier 18 equals the standard reference voltage from the reference generator 26, the comparator amplifier 28 generates trigger signals to the flip-flops 22 and 30.

In operation of the circuit of FIG. 1, at clock time ($t_0$) an altitude hold engage signal to the clock source 20 enables the flip-flop 22 to clock the counter 24 that produces a stairstep voltage at the input of the summing amplifier 18. This stairstep voltage is summed with the output of the nonlinear circuit 16 and when the voltage from the digital-to-analog converter 25 plus the output of the nonlinear circuit 16 equals or exceeds the standard reference voltage from the reference generator 26, the comparator amplifier 28 disables the flip-flop 22 to shut down the counter 24 and enable the flip-flop 30 to clock the counter 32. The digital-to-analog converter 33, connected to the counter 32, also generates a stairstep voltage although at smaller increments than the converter 25. The output from the digital-to-analog converter 33 is now summed in the amplifier 18 with the output of the nonlinear circuit 16 and when equal to the output of the reference generator 26 actuates the comparator 28 to disable the flip-flop 30 to shut down the counter 32. At this time, the output of the summing amplifier 18 is equal to a desired altitude and this altitude hold control voltage is applied through the output stage 34 to a conventional aircraft flight control system.

Effectively, the system of FIG. 1 creates electronically at the output of the digital-to-analog converters 25 and 33 voltages whose sum is equal to the linearized output of the pressure transducer 14. This voltage at the output of the digital-to-analog converters 25 and 33 is generated upon command and at the time the counters 24 and 32 have been stopped by action of the comparator 28 there is stored in the counters a digital voltage representing a desired altitude. This digital voltage as stored in the counters 24 and 32 is converted into an analog voltage and continually summed with the output of the nonlinear circuit 16 and compared with the standard reference voltage from the generator 26 to generate an altitude hold control voltage. If the aircraft deviates in altitude above or below the voltage stored in the counters 24 and 32, a change in the altitude hold control results, and this change is equal to the difference between the voltage stored in the counters 24 and 32 and the output of the nonlinear circuit 16.

Figure 2:
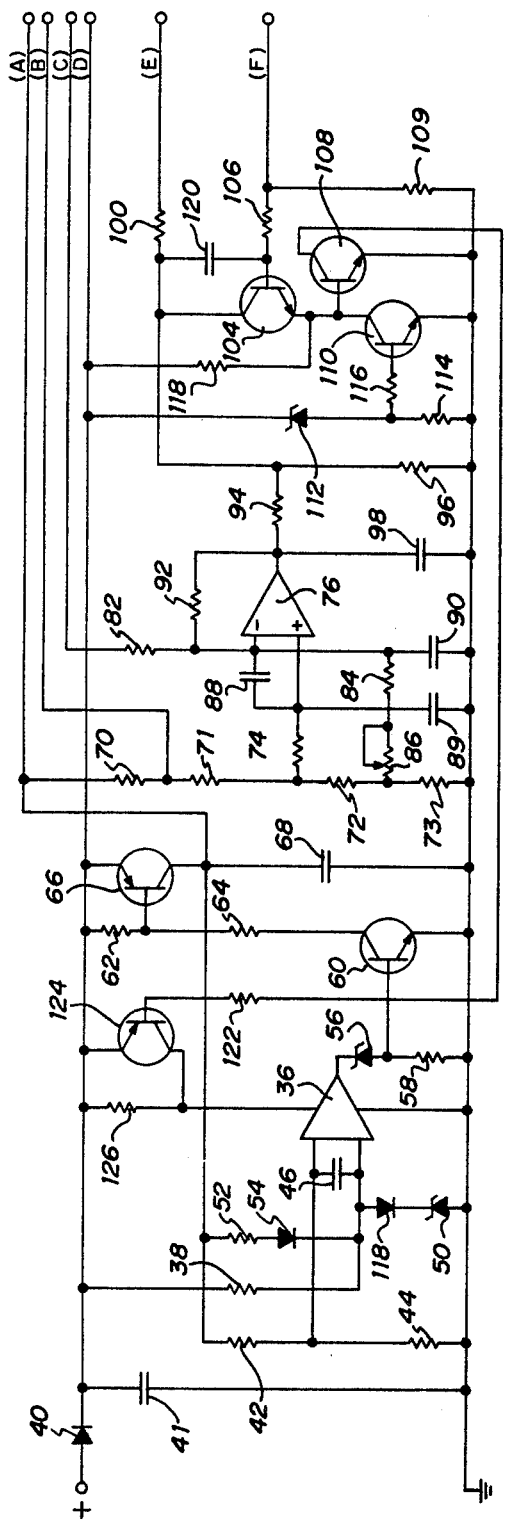
FIG. 2 is a schematic diagram of the power supply and temperature controller of FIG. 1.

To generate a signal varying linearly with altitude at the output of the nonlinear circuit 16, the temperature controller 12 and the pressure transducer 14 are energized by the power supply 10 with the temperature controller 12 maintaining a controlled temperature environment for the pressure transducer, as shown in FIG. 2.

Referring to FIG. 2, the power supply comprises an operational amplifier 36 having one input coupled through a resistor 38 to a voltage source at the interconnection of a capacitor 41 and an isolation diode 40, the latter in turn connected to a voltage source (not shown). A second input to the amplifier 36 is tied to a divider network comprising resistors 42 and 44 as part of a feedback loop. Interconnecting the two inputs of the amplifier 36 is a filter capacitor 46. A circuit comprising a diode 54 in series with a resistor 52 establishes a regulated voltage input to the amplifier 32 by developing a constant voltage across a diode 118 in series with a Zener diode 50.

An output of the amplifier 36 is level shifted by a Zener diode 56 in series with a resistor 58 so that the output of amplifier 36 can provide correct base drive to a transistor 60. The collector circuit for the transistor 60 includes resistors 62 and 64 with the former connected to the power supply voltage at the diode 40. An output of the transistor 60 is developed at the interconnection of the resistors 62 and 64 and applied as a base drive to a transistor 66. The collector electrode of the transistor 66 is coupled to ground through a capacitor 68 and also tied to the resistance network of resistors 42 and 44. The voltage appearing at the collector of transistor 66 is the regulated output voltage of the power supply.

Also coupled to the collector electrode of the transistor 66 is a resistance network including resistors 70-73. A voltage developed at the interconnection of the resistors 70 and 71 is applied to the base electrode of a diode 78, FIG. 3, mounted as a temperature sensor in proximity to a pressure sensor 80, both as a part of the pressure transducer 14. A voltage developed at the interconnection of the resistors 71 and 72 is applied through a resistor 74 to one input of an operational amplifier 76. The second input to the operational amplifier 76 is tied to the emitter electrode of the diode 78 through a resistor 82. The resistor 82 is part of an input circuit including a resistor 84 and a potentiometer 86, the latter tied to the interconnection of the resistors 72 and 73. Also connected as a part of the input circuit to the operational amplifier 76 are capacitors 88-90. A feedback loop for the operational amplifier 76 includes a resistor 92 connected at the resistor 82 to the inverting input of the operational amplifier 76.

An output voltage from the amplifier 76 is applied to a resistor 94 as part of the network including a resistor 96 and a capacitor 98. A voltage developed at the interconnection of the resistors 94 and 96 is applied as a base drive through a resistor 100 to a power transistor 102, FIG. 3, operating as a heater for the pressure sensor 80. A capacitor 103 is connected between the base and emitter electrodes of power transistor 102. The emitter electrode of the power transistor 102 is tied to the base electrode of a transistor 104 through a base drive resistor 106, and to ground through a current sensing resistor 109.

The transistor 104 is part of a current limiter circuit including transistors 108 and 110. The transistor 110 is biased at times by the current through Zener diode 112 connected to the diode 40 and also connected to a resistor 114. The base drive current for the transistor 110 is developed through a resistor 116. The collector electrode of the transistor 104 is tied to the output network of the amplifier 76 and has an emitter electrode coupled through a resistor 118 to the diode 40. A filtering capacitor 120 interconnects the base and collector electrodes of the transistor 104. A voltage developed at the emitter electrode of the transistor 104 drives the transistor 108 having a collector electrode coupled through a resistor 122 to the base electrode of a transistor 124. The transistor 124 controls the drive voltage to the operational amplifier 36 through a parallel connected resistor 126.

Figure 3:
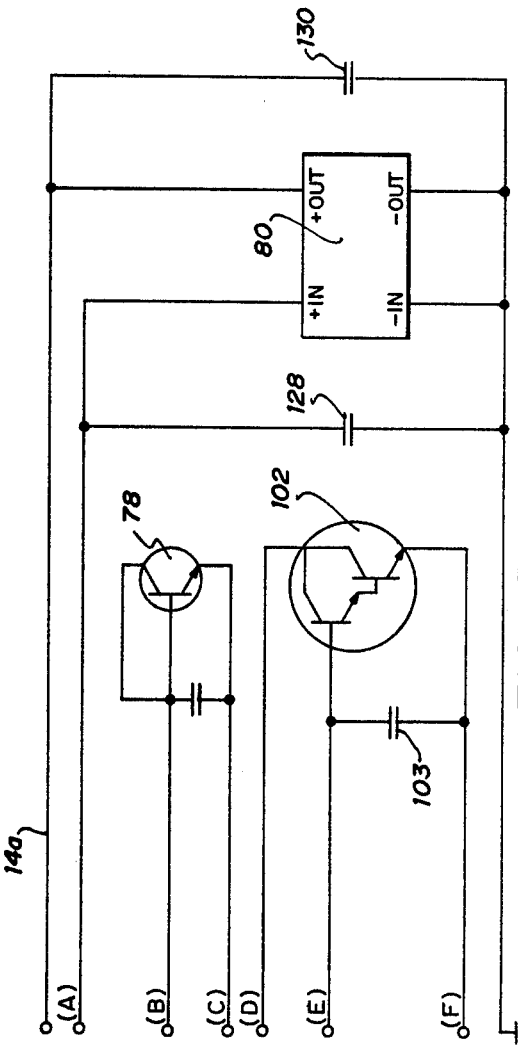
FIG. 3 is a schematic diagram of the pressure transducer of FIG. 1.

Operationally, the circuits of FIGS. 2 and 3 include a balanceable bridge wherein the diode 78 is in one arm of the bridge that controls the base drive to the transistor 102. The base drive to the transistor 102 is controlled from the operational amplifier 76 through the circuitry as illustrated. This maintains the proper temperature and environment for the pressure sensor 80 as part of the pressure transducer 14.

As illustrated, the pressure sensor 80 has two input terminals, one connected to ground and the second to the regulated voltage at the collector electrode of the transistor 66. A filter capacitor 128 is connected across the input terminals of the pressure sensor 80.

An output voltage from the pressure sensor 80 varies linearly with pressure and is developed across two output terminals, one connected to ground and the second to a line 14a tied to the nonlinear circuit 16. A filter capacitor 130 is tied across the two output terminals of the pressure sensor.

Figure 4:
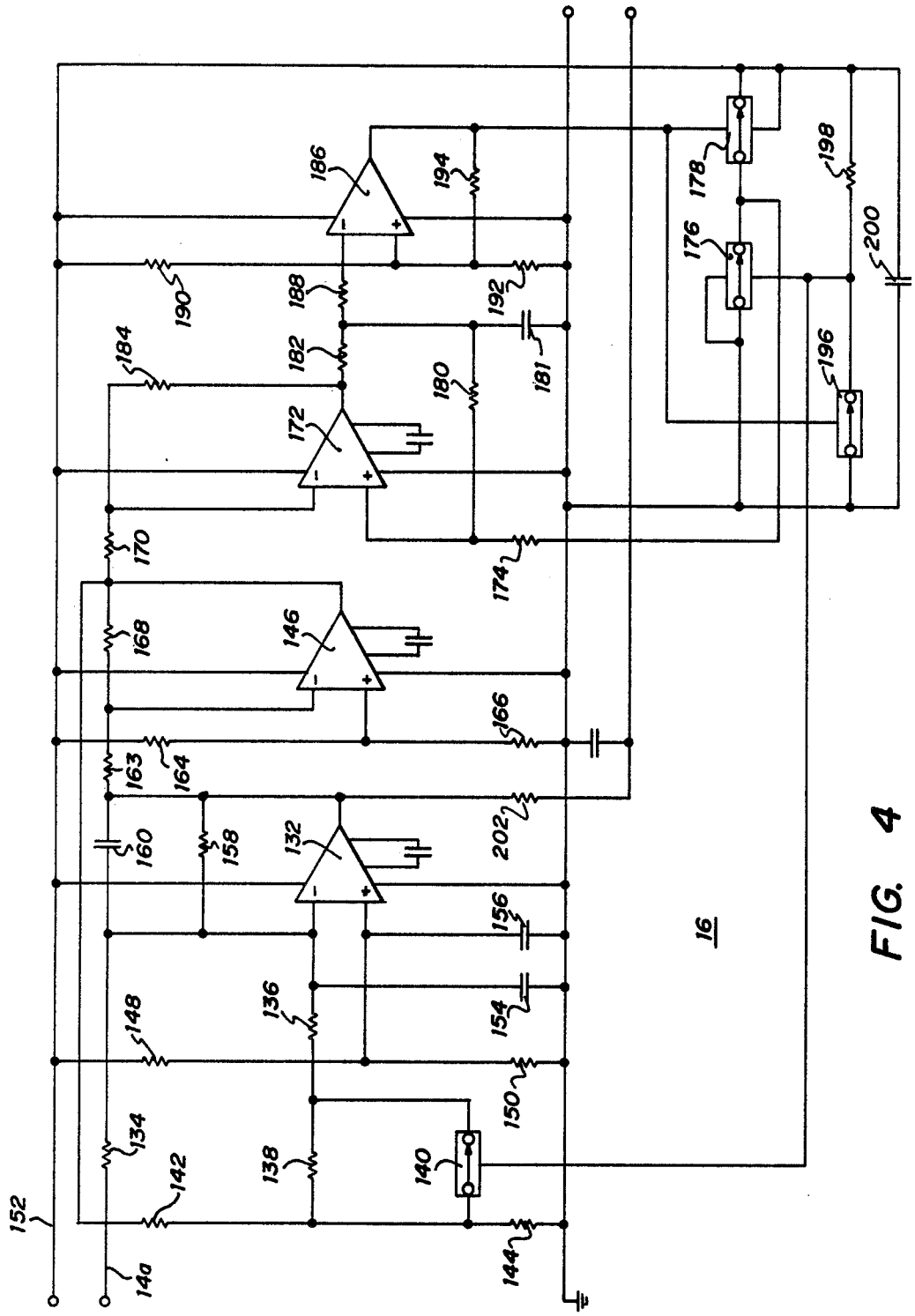
FIG. 4 is a schematic of the nonlinear circuit of FIG. 1 providing an output voltage varying linearly with altitude.

As explained, an output voltage from the pressure transducer 14 is applied to the nonlinear circuit 16 shown schematically in FIG. 4. A voltage on the line 14a is applied to the inverting input of an amplifier 132 through an input resistor 134. Also coupled to the inverting input of the amplifier 132 is a resistor 136 in series with a resistor 138 selectively shunted by a switch 140. The resistor 138 is tied to the interconnection of resistors 142 and 144 as a voltage divider from the output of an operational amplifier 146. Tied to the noninverting input of the amplifier 132 is a voltage divider network comprising resistors 148 and 150 with the resistor 148 tied to a supply line 152 coupled to a DC voltage source (not shown). Also tied to the inverting and noninverting inputs of the amplifier 132 are filter capacitors 154 and 156, respectively.

An output of the amplifier 132 is coupled to a feedback loop including a resistor 158 in parallel with a capacitor 160. Thus, the amplifier 132 is connected as an integrating amplifier. The output of the amplifier 132 is also connected through a resistor 163 to the inverting input of the amplifier 146 connected as an inverting amplifier. The bias voltage to the amplifier 146 is established at the interconnection of resistors 164 and 166 with the former connected to the supply line 152. A feedback loop for the amplifier 146 includes a resistor 168.

An output from the inverting amplifier 146 is coupled through a resistor 170 to the inverting input terminal of an operational amplifier 172. The noninverting input terminal of the amplifier 172 is connected through a resistor 174 to the interconnection of switches 176 and 178. Through selective operation of the switches 176 and 178 the noninverting input terminal of the amplifier 172 is coupled to ground through the switch 176 or to the supply line 152 through the switch 178. Also tied to the noninverting input of the amplifier 172 is a resistor 180 as part of a timing circuit including a timing capacitor 181 connected to the output of the amplifier through a resistor 182. A resistor 184 is interconnected in a feedback loop from the output of the amplifier 172 to the inverting input terminal at the resistor 170.

The voltage appearing across capacitor 181 is applied to the inverting input terminal of an amplifier 186 through a drive resistor 188. The amplifier 186 is connected as an inverting comparator with hysteresis characteristics with the reference voltage established at the noninverting input terminal at the interconnection of the resistors 190 and 192 as part of a voltage divider. A feedback loop for the amplifier 186 includes a resistor 194.

The output voltage of the amplifier 186 controls the switch 178 and also controls a switch 196. The switch 196 is in series with a resistor 198 and in parallel with a capacitor 200 with the interconnection of the resistor and the capacitor tied to the supply line 152 and the interconnection of the capacitor and the switch tied to ground. The voltage developed across the resistor 198 with the closing of the switch 196 controls the operation of the switches 140 and 176, as will be explained.

In operation of the circuit of FIG. 4, a signal varying linearly with pressure, as generated on the line 14a, is applied to the integrator amplifier 132 with the output of this amplifier coupled through a resistor 202 to the summing amplifier 18. It is the output of the amplifier 132 that will be made to vary linearly with altitude.

From the altitude of around −1000 feet to an altitude of near 2000 feet the output of the amplifier 132 varies essentially linearly with altitude without further operation of the circuit 16. However, an output of the amplifier 132 is also applied to the inverting amplifier 146 which is operated in a saturated mode by means of the bias voltage established by the resistors 164 and 166 up to about an altitude of 2000 feet. This saturated condition is thus controlled by the voltage developed across the resistors 164 and 166.

When the operational amplifier 146 is driven out of saturation, then the process of linearization with altitude begins. This linearization process incorporates the operation of the amplifiers 146, 172 and 186 for controlling the switches 176, 178 and 196. The operation of this circuit may be generally characterized as a free running multivibrator.

An output of the amplifier 146 is applied to the inverting input of the amplifier 172 that provides an output for charging the timing capacitor 181 that comprises the timing element of the multivibrator. The capacitor 181 is alternately charged and discharged by the amplifier 172 depending upon the differential input to the amplifier 172.

The voltage applied to the noninverting input of the amplifier 172 is essentially a square wave having a duty cycle varying with the output of the amplifier 146. Through the operation of the amplifier 186 responding to the output of the amplifier 172, the switches 176 and 178 are alternately opened and closed to alternately couple the resistor 174 to ground or to the supply voltage on the supply line 152. As illustrated, the switch 178 is operated directly from the output of the amplifier 186 while the switch 176 is operated through the switch 196. This latter switch is also directly operated by the output of the amplifier 186 and functions as an inverter to cause the switches 176 and 178 to operate 180° out of phase.

A voltage developed across the resistor 198 by operation of the switch 196 is also a square wave voltage having a duty cycle as determined by the output voltage of amplifier 146. This voltage is coupled to the switch 140 to alternately shunt the resistor 138 in the input line to the amplifier 132. The voltage developed across the resistor 198 is a duty cycle controllable square wave that controls the switch 140 to function as a modulator. From the −1000 foot altitude level to +2000 feet of altitude, the switch 140 is open more than 99 percent of the square wave period and the output of the amplifier 132, as explained, varies with the signal on the line 14a. This is controlled by the resistors 142, 144, 148 and 150. As connected, they provide a zero voltage differential to the amplifier 132 for a specified input signal on the line 14a. Thus, any appropriate signal appearing on the line 14a provides an input signal to the amplifier 132 which is amplified and applied through the resistor 202 to the summing amplifier 18.

As the output of the amplifier 132 varies above a 2000 foot altitude level, the output of the amplifier 146 comes out of saturation and by operation of the amplifier 172, varies the charging cycle of the timing capacitor 181. This generates the duty cycle controlled square wave that alternately opens and closes the switch 140. With the switch 140 closed, the resistor 138 is shunted thereby varying the input signal to the amplifier 132 and in turn varying the signal applied to the summing amplifier 18. Modulating the operation of the switch 140 from the duty cycle controlled square wave provides a second order approximation of the correction factor needed to linearize the output of the pressure transducer 14 with altitude. This signal, which is now linear with altitude, is utilized to maintain the aircraft in an altitude hold mode.

To maintain an aircraft at a selected altitude there must also be generated a voltage equal to the linearized output of the pressure transducer 14 at the selected altitude. This altitude reference voltage is generated when an altitude hold engage signal is entered into the flip-flop 22. To maintain the desired altitude it is then necessary to store the altitude reference voltage and if the aircraft deviates from the stored value an error voltage will be developed that is utilized as an altitude hold control voltage.

Figure 5:
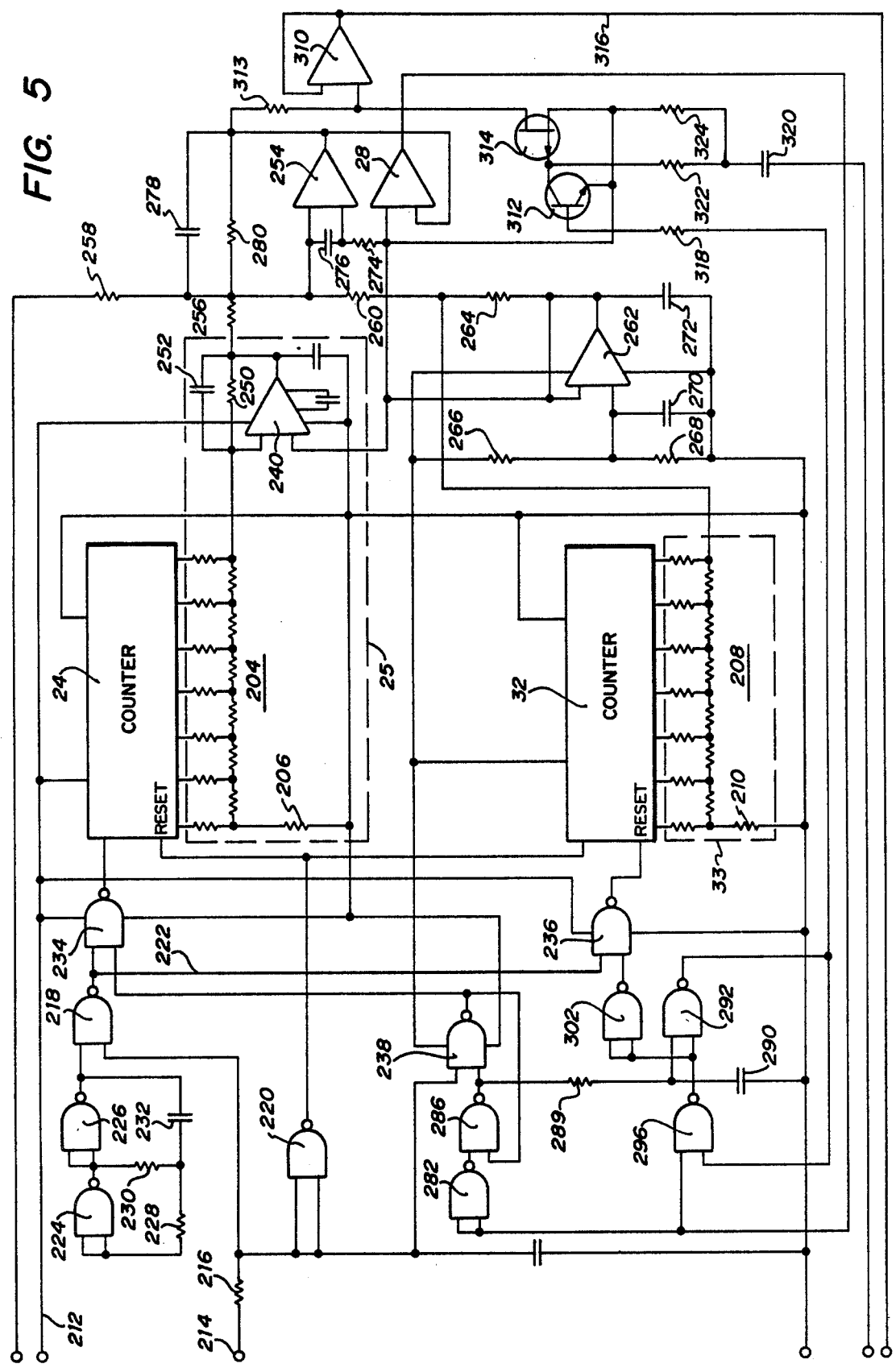
FIG. 5 is a schematic of the counters, summing network, comparator, and output stage of FIG. 1.

Referring to FIG. 5, the altitude reference voltage is generated at the output of the digital-to-analog converters 25 and 33 connected to the counters 24 and 32, respectively. The analog output as generated by the converters 25 and 33 is developed across resistor ladder networks. The ladder network for the converter 25 comprises the network 204 including a resistor 206 and the ladder network for the converter 33 comprises the resistor network 208 including a resistor 210. Basically, these counters function as ripple counters where the analog output from the converters 25 and 33 increases in discrete quantities from ground to some positive supply voltage (as connected to a supply line 212) as the counter advances in discrete steps.

To place an aircraft flight control system in an altitude hold mode a pilot or automated device activates a control to provide an altitude hold engage signal that is applied to an input terminal 214. This signal is applied through a resistor 216 to one input of a NAND gate 218 as part of initiating logic to start the counter 24. The input to the NAND gate 218 causes clock pulses generated by the clock source 20 to appear on line 222. At the same time, the altitude hold engage signal is applied to a NAND gate 220 that releases the counters from an initial reset state.

The clock source 20 comprises NAND gates 224 and 226 and a timing network consisting of resistors 228 and 230 along with a timing capacitor 232. The timing pulses on the line 222 are applied to NAND gates 234 and 236.

The altitude hold engage signal is also applied to a NAND gate 238 that forms a part of the flip-flop 22 that provides an output signal applied to the NAND gate 234. With this signal applied to the HAND gate 234, the clock pulses from the NAND gate 218 are applied to the counter 24 and the counter begins to step in discrete increments. The output voltage of the counter 24 is applied to the converter 25 that develops an analog voltage as one input of an operational amplifier 240 that forms a part of the converter 25 and produces an output voltage that steps down from the supply line 212 level in discrete steps.

Referring to FIGS. 6 and 7, there are shown waveforms generated by operation of the circuit of FIG. 5. The altitude hold engage signal is illustrated by the wave 242 to be initiated at time $t_0$. The output of the flip-flop 220 steps from some positive level to zero as illustrated by the curve 244 thereby enabling the counters 24 and 32. The output of the NAND gate 238 at time $t_0$ is at some positive value as given by the curve 246. At time $t_0$ the output of the amplifier 240 steps down from the supply voltage on the line 212 as illustrated by the curve 248. As the counter steps down the output of the amplifier 240 decreases in incremental steps as illustrated.

The operational amplifier 240 is interconnected with a feedback circuit comprising a resistor 250 and a capacitor 252. An output voltage from the amplifier 240 is applied to a summing network for an operational amplifier 254 as part of the summing amplifier 18. This summing network includes a resistor 256 connected to the output of the amplifier 240 and a resistor 258 in series with the resistor 202 to the output of the amplifier 132. Also forming a part of the summing network is a resistor 260 connected to the output of an amplifier 262 through a resistor 264 and also connected to the ladder network 208.

The operational amplifier 262 is a part of the reference generator 26 and includes a network of resistors 266 and 268 in addition to capacitors 270 and 272. The reference voltage is estabished at the interconnection of the resistors 266 and 268 with the resistor 266 connected to the supply line 212 and the resistor 268 connected to ground.

With the interconnection as shown, the operational amplifier 254 receives at one input the sum of the voltages from the amplifier 132, the amplifier 240, and the attenuated output of the converter 33. A second input to the operational amplifier 254 is the standard reference voltage output of the amplifier 262. This voltage is also applied to a second input of the amplifier 240. The input network to the amplifier 254 from the amplifier 262 includes a resistor 274 and a capacitor 276. As illustrated, the amplifier 254 is connected as an inverting amplifier with a feedback network consisting of a filter capacitor 278 in parallel with a resistor 280.

As the output of the amplifier 240 steps down in accordance with the curve 248, the output of the amplifier 254 comes out of saturation and begins to step up and eventually increases to a value greater than the standard reference voltage at the output of the amplifier 262. This output of the amplifier 254, as illustrated by the curve 304 of FIG. 6, is applied to a second input of the comparator amplifier 28 that produces an output voltage applied to one input of a NAND gate 282 as part of the flip-flop 22.

At time $t_1$ the output of the amplifier 254 steps above the standard reference voltage from the amplifier 262 and the output of the comparator 28 steps to a positive level as illustrated by the curve 298. At the same time, the NAND gate 282 steps from some positive value to zero as illustrated by the curve 284 of FIG. 7.

The output of the NAND gate 282 is applied to one input of a NAND gate 286 that has a second input connected to the output of the NAND gate 238. With one input to the NAND gate 286 at a positive logic level as given by the curve 246 and the second changed to a zero logic level as given by the curve 284, the output of the NAND gate 286 steps from the zero logic level at time $t_1$ to some positive logic level as given by the curve 288. This drives the output logic level of the NAND gate 238 to a zero level opening the gate 234 and thereby disconnecting the clock pulses from the counter 24. The counter 24 now stores the final value as one part of an altitude reference voltage.

An output from the NAND gate 286 is also applied to a timing circuit consisting of a resistor 289 in series with a capacitor 290 with the interconnect applied to one input of a NAND gate 292 as part of the flip-flop 30. By the introduction of the timing network, the voltage applied to the input of the NAND gate 292 varies in accordance with the curve 294 of FIG. 7, lagging the output level changes of NAND gate 286.

A second input to the NAND gate 292 is the output of a NAND gate 296 that is connected to the output of the amplifier 28. A second input to the NAND gate 296 is the output of the NAND gate 292.

As the input to the NAND gate 296 varies in accordance with the curve 298 of FIG. 6, the output steps from some positive logic level to a zero logic level as given by the curve 300 of FIG. 7. This signal is applied to the inputs of a NAND gate 302 that now steps at time $t_1$ from an output logic zero level to a positive logic level as given by the curve 305. This gates the clock pulses on the line 222 through the gate 236 to the counter 32.

Counter 32 now begins to run and the attenuated output of the converter 33 is applied directly through the resistor 260 to the input of the amplifier 254. Note, that the digital-to-analog converter 25 included an inverting amplifier 240 thus the output generated by the converter 33 is of opposite polarity as applied to the input of the amplifier 254. This causes the output of the amplifier 254 to step down in incremental steps as given by the curve 304 of FIG. 6. Note, that the authority of the counter 32 is less than that of the counter 24. Thus, the decrementing steps are much smaller than the incrementing steps as generated at the output of the amplifier 240 before the time $t_1$.

When the output of the amplifier 254 steps below the standard reference voltage at the output of the amplifier 262 the counter 32 is turned off. At time $t_2$ the output of the comparator amplifier 28 steps to zero as given by the curve 298. This drives the output of the NAND gate 296 to the positive logic level as given by the curve 300 and the NAND gate 292 now steps to a zero logic level as given by the curve 306. This drives the second input to the NAND gate 296 to a zero logic level thereby locking out any further operation of the amplifier 28.

The counter 32 now stores a digital value which when combined with the digital value stored in the counter 24, through the converters 25 and 33 of networks 208 and 204, respectively, represents a desired altitude signal for comparison with the output of the nonlinear circuit 16.

After time $t_2$, any variation in the output of the nonlinear circuit 16 will be reflected as a variation in the output of the amplifier 254. This amplifier is coupled to the output stage 34 that comprises an operational amplifier 310 and transistors 312 and 314. The output of the amplifier 254 is applied through a resistor 313 to one input of the amplifier 310 and to an electrode of the field effect transistor 314. An output of the amplifier 310 is the altitude hold control voltage on a line 316 applied to the conventional control system for positioning control surfaces of an aircraft.

This is not the DC error voltage at the output of the amplifier 254, but rather the amplifier output chopped by operation of the transistor 314. The transistor 312 has a base drive from the output of the NAND gate 292 through a resistor 318. The chopping voltage to the transistor 314 is applied through a capacitor 320 to resistors 322 and 324. The chopping voltage is the normal excitation of an existing altitude hold system. Where the altitude hold control utilizes a DC voltage the chopper of transistors 312 and 314 may not be required. Thus, as utilized in the circuit illustrated the transistor 314 chops the error voltage at the output of the amplifier 254 as applied to the input of the amplifier 310 which appears as an AC signal on the line 316 for coupling to the altitude control system. The transistor 312 is turned off only when the reference voltage generation cycle is complete and the chopped AC output signal appears only when the generation cycle is completed.

While only one embodiment of the invention, together with modifications thereof, has been described in detail herein and shown in the accompanying drawings, it will be evident that various further modifications are possible without departing from the scope of the invention.

What is claimed is:

1. A system for maintaining aircraft altitude in combination with aircraft control surfaces, comprising in combination:
   a transducer having an output voltage varying with altitude pressure,
   circuit means responsive to the output voltage of said transducer and providing an output voltage varying with altitude,
   converter means generating a reference altitude output voltage,
   a standard reference voltage source,
   means for summing the output voltage from said converter means with the output voltage of said circuit means and the standard reference voltage to generate an altitude hold control voltage, and
   means for comparing the altitude hold control voltage with the standard reference voltage to generate a voltage to said converter means.

2. A system for maintaining aircraft altitude as set forth in claim 1 wherein said circuit means includes a square wave generator free running multivibrator.

3. A system for maintaining aircraft altitude as set forth in claim 2 wherein said free running multivibrator includes a voltage controlled current source, and
   a timing capacitor responsive to the output of said current source.

4. A system for maintaining aircraft altitude as set forth in claim 3 wherein said circuit means includes an integrator responsive to the output voltage of said transducer and generating a voltage to control said current source.

5. A system for maintaining aircraft altitude as set forth in claim 4 including a summing network at the input of said integrator, and
   circuit means responsive to the output of said multivibrator for modifying said summing network.

6. A system for maintaining aircraft altitude as set forth in claim 4 including means responsive to the output of said integrator and providing the output voltage varying with altitude.

7. A system for maintaining aircraft altitude as set forth in claim 4 wherein said circuit means includes an amplifier connected between said integrator and said current source and biased into saturation below a preestablished output of said transducer.

8. A system for maintaining aircraft altitude in combination with aircraft control surfaces, comprising in combination:
   a transducer having an output voltage varying with altitude pressure,
   a nonlinear circuit responsive to the output voltage of said transducer and providing an output voltage varying with altitude.
   a first converter including a counter connected to a digital-to-analog converter and generating a first altitude reference output voltage,
   a second converter including a counter connected to a digital-to-analog converter and generating a second altitude reference voltage,
   a standard reference voltage source,
   means for summing the output voltage from said transducer with the output voltages from said first and second converters and the standard reference voltage to generate an altitude hold voltage, and
   means for comparing the altitude hold voltage with the standard reference voltage to generate a switching control voltage to said first and second converters.

9. A system for maintaining aircraft altitude as set forth in claim 8 including means for activating the operation of said first converter to generate the first altitude reference output voltage.

10. A system for maintaining aircraft altitude as set forth in claim 9 including means responsive to the switching voltage for interrupting the operation of said first converter and activating the operation of said second converter.

11. A system for maintaining aircraft altitude as set forth in claim 10 including means responsive to the switching voltage for interrupting the operation of said second converter.

12. A system for maintaining aircraft altitude as set forth in claim 8 including a clock source for providing clock pulses to said first and second converters.

13. A system for maintaining aircraft altitude in combination with aircraft control surfaces, comprising in combination:
- a transducer having an output voltage varying with altitude pressure,
- an integrator responsive to the output voltage of said transducer and generating an output voltage varying with altitude,
- an amplifier connected to the output of said integrator and biased into saturation below a preselected output of said transducer,
- a square wave generator free running multivibrator responsive to the output of said amplifier and generating switching voltages,
- a summing network at the input of said integrator and including circuit means responsive to the output of said multivibrator for modifying said summing network,
- a first converter including a counter connected to a digital-to-analog converter and generating a first altitude reference output voltage,
- a second converter including a counter connected to a digital-to-analog converter and generating a second altitude reference voltage,
- a standard reference voltage generator,
- means for summing the output voltage varying with altitude with the output voltage from said first and second converters and the standard reference voltage to generate an altitude hold control voltage, and
- means for comparing the altitude hold control voltage with a reference voltage to generate a switching control voltage to said first and second converters.

14. A system for maintaining aircraft altitude as set forth in claim 13 including means for temperature compensating the output of said transducer.

15. A system for maintaining aircraft altitude as set forth in claim 13 wherein said free running multivibrator includes a voltage controlled current source responsive to the output of said amplifier, and
a timing capacitor responsive to the output of said current source.

16. A system for maintaining aircraft altitude as set forth in claim 13 including logic circuitry responsive to said switching control voltage to interrupt the operation of said first converter and activate the operation of said second converter when the sum of the voltages exceeds the standard reference voltage.

17. A system for maintaining aircraft altitude in combination with aircraft control surfaces, comprising:
- means responsive to altitude pressure and generating an output signal varying with altitude,
- means for generating a reference altitude signal,
- means for supplying a standard reference signal,
- means for combining the reference altitude signal with the signal varying with altitude and with the standard reference signal to generate an altitude hold signal, and
- means for comparing the altitude hold control signal with the standard reference signal to generate a control signal to said means for generating a reference altitude signal.

18. A system for maintaining aircraft altitude as set forth in claim 17 wherein said means for generating a reference altitude signal includes a first channel for generating a most significant component of the reference altitude signal and a second channel for generating the least significant component of the reference altitude signal.

19. A system for maintaining aircraft altitude as set forth in claim 18 wherein said means for generating includes means responsive to the control signal for disabling the first channel and enabling said second channel with a first comparison of the altitude hold signal with the standard reference signal and for disabling the second channel with a second comparison of the altitude hold signal with the standard reference.

20. A system for maintaining aircraft altitude as set forth in claim 18 wherein said means for combining includes means responsive to the most significant component of said first channel and means responsive to the least significant component of said second channel to generate a composite altitude hold signal.

21. A system for maintaining aircraft altitude as set forth in claim 18 wherein said first channel includes a counter connected to a digital-to-analog converter for generating the most significant component of the reference altitude signal, and said second channel includes a counter connected to a digital-to-analog converter for generating the least significant component of the reference altitude signal.

22. A system for maintaining aircraft altitude as set forth in claim 21 wherein said means for generating includes means for generating clock pulses, and said first channel includes clock control means responsive to the control signal to couple the clock pulses to the counter of said first channel, and said second channel includes clock control means responsive to the control signal to couple the clock pulses to the counter of said second channel.

23. A system for maintaining aircraft altitude as set forth in claim 17 wherein said means responsive to altitude pressure includes means for generating an output signal varying linearly with altitude.

* * * * *